United States Patent
Tan et al.

(10) Patent No.: US 11,169,541 B2
(45) Date of Patent: *Nov. 9, 2021

(54) DETECTING AND FOLLOWING TERRAIN HEIGHT AUTONOMOUSLY ALONG A FLIGHT PATH

(71) Applicant: Suzhou Eavision Robotic Technologies Co., Ltd., Jiangsu Province (CN)

(72) Inventors: Han-Shue Tan, Concord, CA (US); Jihua Huang, Dublin, CA (US)

(73) Assignee: Suzhou Eavision Robotic Technologies Co., Ltd.

( * ) Notice: Subject to any disclaimer, the term of this patent is extended or adjusted under 35 U.S.C. 154(b) by 271 days.

This patent is subject to a terminal disclaimer.

(21) Appl. No.: 16/426,392

(22) Filed: May 30, 2019

(65) Prior Publication Data

US 2019/0317527 A1 Oct. 17, 2019

Related U.S. Application Data

(63) Continuation of application No. 15/583,834, filed on May 1, 2017, now Pat. No. 10,353,401.

(51) Int. Cl.
*G05D 1/06* (2006.01)
*G05D 1/08* (2006.01)
*B64C 39/02* (2006.01)
*B64D 1/18* (2006.01)
*G08G 5/00* (2006.01)

(52) U.S. Cl.
CPC ......... *G05D 1/0646* (2013.01); *B64C 39/024* (2013.01); *B64D 1/18* (2013.01); *G05D 1/0808* (2013.01); *G08G 5/0086* (2013.01); *B64C 2201/12* (2013.01); *G08G 5/0021* (2013.01); *G08G 5/0052* (2013.01)

(58) Field of Classification Search
CPC .. G05D 1/0646; G05D 1/0808; B64C 39/024; B64C 2201/12; B64D 1/18; G08G 5/0086; G08G 5/0021; G08G 5/0052
See application file for complete search history.

(56) References Cited

U.S. PATENT DOCUMENTS

| 9,513,635 | B1 | 12/2016 | Bethke |
| 2013/0325217 | A1 | 12/2013 | Henri |
| 2016/0307448 | A1 | 10/2016 | Vladimir |
| 2016/0327956 | A1 | 11/2016 | Xingyu |
| 2016/0376031 | A1 | 12/2016 | Jeff |
| 2017/0015416 | A1 | 1/2017 | Raymond |
| 2017/0248969 | A1 | 8/2017 | Young-Kuk |

FOREIGN PATENT DOCUMENTS

WO 20160131847 A9 3/2017

*Primary Examiner* — Michael D Lang
(74) *Attorney, Agent, or Firm* — Van Pelt, Yi & James LLP

(57) ABSTRACT

A distance from an aerial vehicle to a terrain feature located forward and lower with respect to the aerial vehicle is measured. An orientation of the aerial vehicle with respect to a reference orientation is detected. At least the measured distance and the orientation of the aerial vehicle is utilized to determine a relative vertical difference between a vertical location of the aerial vehicle and a vertical location of the terrain feature. The determined relative vertical difference is utilized to automatically adjust a flight altitude of the aerial vehicle.

20 Claims, 12 Drawing Sheets

DETECTING AND FOLLOWING TERRAIN HEIGHT AUTONOMOUSLY ALONG A FLIGHT PATH

CROSS REFERENCE TO OTHER APPLICATIONS

This application is a continuation of co-pending U.S. patent application Ser. No. 15/583,834, entitled DETECTING AND FOLLOWING TERRAIN HEIGHT AUTONOMOUSLY ALONG A FLIGHT PATH filed May 1, 2017 which is incorporated herein by reference for all purposes.

BACKGROUND OF THE INVENTION

Harvesting crops manually is a labor-intensive activity, in particular, the application of pesticides/fertilizers. Due to public concern in regards to the release of chemicals into the environment and human exposure to chemicals, the unmanned aerial vehicles (UAVs) may be utilized in aerial application of spray material (e.g., spraying pesticide/fertilizer). Employing operators to remotely control UAVs, however, is labor-intensive and requires long periods of high-concentration to attention.

For UAVs aiming to deliver pesticides/fertilizers directly to crops, an important requirement is that they must be able to fly at low constant heights above the target crops to ensure efficiency, minimal waste, as well as complete and even coverage. Flying too high above the crop results in large amounts of pesticides/fertilizers being lost into the open air. This not only poses a health and environmental hazard, but also fails to deliver the necessary pesticides/fertilizers to the crops. On the other hand, flying too close to the crops limits the coverage of the spray, increases the danger of colliding with crops, and poses a risk to the UAVs should the terrain rise. Thus arises the need for maintaining the UAV at low fixed heights above the crops. In other words, it is desirable for the UAVs to be able to adapt to and follow changing terrain, whether it be elevation or obstacles, while maintaining a relatively constant height above the crops/ground. Such capability is important for UAVs to accurately deliver pesticides/fertilizers to crops planted in areas such as valleys, hills, and terraces.

BRIEF DESCRIPTION OF THE DRAWINGS

Various embodiments of the invention are disclosed in the following detailed description and the accompanying drawings.

DETAILED DESCRIPTION

Figure 1:
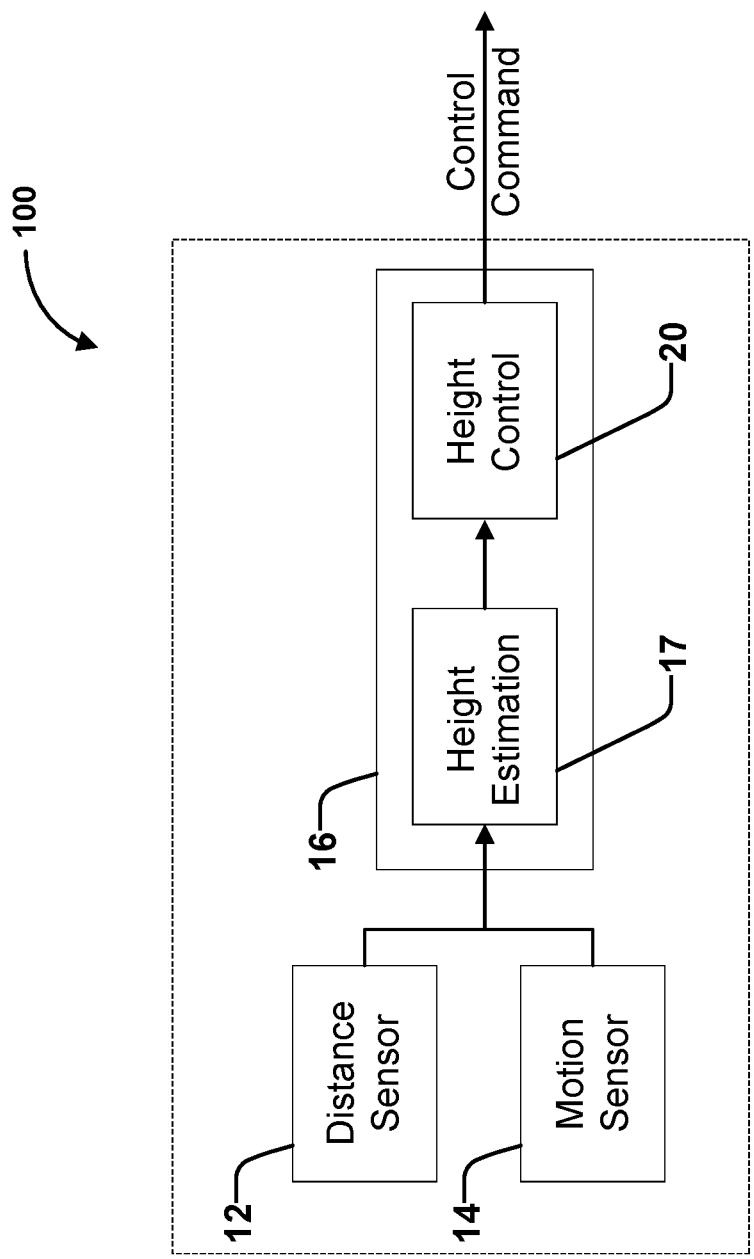
FIG. 1 is a block diagram illustrating an embodiment of a height estimation and control system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

For high flying aircraft, altimeters are usually employed to determine elevation above sea level based on changing air pressures. This is often the main method for which high flying aircraft avoid ground collisions. Because planes equipped with jet engines, such as commercial flights and cargo jets, have a cruising altitude of nearly 39,000 feet, they do not actively rely on terrain following technology. At very low altitudes, such as a few meters, altimeters lack the necessary accuracy to provide reliable height readings to ensure height clearance and ground collision avoidance. Moreover, the altimeters alone facilitate flights at fixed altitudes, not fixed heights above the terrain.

A low flying aircraft may perform terrain following using terrain databases. With the terrain database providing detailed elevation of the terrain, a low flying aircraft gets its current altitude from an altimeter and computes its height above the terrain by comparing its altitude with the elevation of the terrain beneath it. The onboard height control system utilizes the computed height and controls the aircraft to maintain a desired height range. However, it is impractical to rely on terrain databases for close-to-ground flights that require UAVs positioned close above the crops. Not only is it prohibitively costly to build a terrain database that details variations less than 0.5 meter, let alone less than 0.1 meter, the height of crops is in constant change as they grow. For example, corn can grow to over 1.5 meters high and sorghum can grow even higher. The terrain database does not have the capability to dynamically reflect crop heights. Thus, such technologies using altimeters and terrain databases are not typically suitable for flights that are only meters above the ground (e.g., in the case of high-efficiency pesticide/fertilizer applications by UAVs).

Thus, in order to allow close-to-ground flight at meters (e.g., 1-3 meters) above crops or ground/terrain, it is desirable to detect the UAV's current height above the crops/ground. This can be achieved using a distance sensor, such as an ultrasonic sensor, to directly measure the UAV's height distance above only the ground directly beneath it. Such methods may be successful in collecting accurate height measurements, and the resulting height control may allow close-to-ground flight on flat terrain or terrain where elevation changes very slowly. However, such methods fail to provide crucial information on upcoming terrain changes ahead of the UAV's path, especially in dealing with irregular terrains. Because changes in flight height/altitude cannot be achieved instantaneously, it may take a considerable amount of time and travel distance before a change to a desired flight height/altitude is completed for a fast moving UAV. Thus it is desirable to anticipate changes in terrain to initiate flight maneuvers well ahead of changes in terrain. For example, if the terrain (e.g., terraces) were to slope upwards rapidly, the UAV may collide with the terrain if it does not have sufficient time to adjust its height accordingly.

As a result, there exists a need for a novel height estimation and control system that allows for safe, close-to-ground flights at meters above the terrain/ground/crop/objects that can adapt to various varying terrain. Such close-to-ground flights are important for applications such as applying pesticide/fertilizer to crops, vegetables, and orchards.

Controlling an aerial vehicle is disclosed. In some embodiments, a height estimation system is utilized by an aerial vehicle (e.g., UAV, drone, airplane, helicopter, or any other flying object) to conduct close-to-ground flights over hilly and/or unpredictable terrain. For example, when installed on a flying aircraft, this height estimation system provides estimates of the aircraft's height above ground, which can be used by a height control system to maintain the aerial vehicle at desired heights in relation to varying terrain. Examples of terrain features include ground materials, hills, plants, trees, crops, orchards, vineries, fences, bushes, trees, buildings, obstacles, snow, or any other object located on or near ground/terrain.

In some embodiments, a distance sensor is utilized to measure a distance from the aerial vehicle to a position on a terrain feature located forward and lower with respect to the aerial vehicle. For example, a distance from the aerial vehicle to a location on a terrain/ground beneath and in front of the aerial vehicle is measured using a Light Detection and Ranging (LIDAR) sensor. A motion sensor (e.g., orientation sensor) is utilized to detect a current orientation of the aerial vehicle with respect to a reference orientation. For example, a pitch angle of the aerial vehicle is determined. At least the distance and the current orientation are utilized to estimate a vertical difference between a vertical location of the aerial vehicle and a vertical height location of the terrain feature forward and lower with respect to the aerial vehicle. For example, based on the geometric relationship of a mounting angle of the distance sensor and the pitch angle of the aerial vehicle with respect to the measured distance, a relative vertical height of the location of the terrain feature is calculated as an estimated relative height at the location. The estimated vertical difference is utilized to automatically provide a flight control command to adjust a flight height of the aerial vehicle. For example, a flight height of the aerial vehicle is automatically adjusted to be lower or higher (without requiring manual human operator control of vertical height) to maintain a consistent height (e.g., within a range) when the aerial vehicle is flying over the object on the terrain/ground.

FIG. 1 is a block diagram illustrating an embodiment of a height estimation and control system. Height estimation and control system 100 may be utilized by an aerial vehicle that executes close-to-ground terrain-following flight. Examples of the aerial vehicle include a fixed wing aircraft, fixed wing drone, unmanned aerial vehicles (UAVs), or any other flying object. The height estimation and control system 100 comprises a distance sensor 12, a motion sensor 14, and a processing unit 16 (e.g., processor). The distance sensor 12 may include one or more of the following: a LIDAR sensor, a radar sensor, an ultrasonic sensor, and any other sensor capable of measuring a distance. Motion sensor 14 may include one or more of the following: an inertial measurement unit, an accelerometer, a gyroscope, an orientation sensor, a magnetometer, a Global Positioning System (GPS) receiver, and any other sensor able to measure an orientation, acceleration, position, specific force, angular rate, or magnetic field. The distance sensor 12 is mounted on the UAV in such a way (e.g., positioned at a forward and downward angle) so as to measure a distance to a position on a surface of a feature on the ground ahead of the UAV. As will be described with FIG. 2, this distance measurement together with measurements from the motion sensor 14 will be used to determine the UAV's relative height above a feature on ground (or terrain) ahead of the UAV.

The processing unit 16 is connected to both the distance sensor 12 and the motion sensor 14 and receives measurement data from the distance sensor 12 and the motion sensor 14. Although only single instances of distance sensor 12 and the motion sensor 14 have been shown, any number of distance sensor 12 and the motion sensor 14 may be connected to processing unit 16 in various embodiments. For example, processing unit 16 receives a plurality of different measurements from different distance sensors and the different distance measurements are utilized to estimate relative heights for different terrain features simultaneously. The processing unit 16 further comprises a height estimation module 17 and a height control module 20. The height estimation module 17 estimates the UAV's relative height above a terrain feature (e.g., ahead of the UAV based on measurements from the distance sensor 12 and the motion sensor 14) and provides this height estimate to the height control module. Based on this relative height estimate, the height control module determines flight control commands (e.g., commands to the motors/engines), which in turn increase or decrease the corresponding lift to maintain the UAV at a desired relative height. By estimating the relative height of terrain features ahead of the UAV in the UAV's flight path and controlling the UAV to maintain a relatively constant height above the terrain features as the UAV flies over the features, the height estimation and control system 100 is capable of reacting in advance to height changes of the upcoming terrain. Such capability to anticipate height changes is crucial as it provides the UAV time to adjust its height before reaching the upcoming terrain, thus allowing the UAV to achieve safely close-to-ground terrain-following flight.

Figure 2:
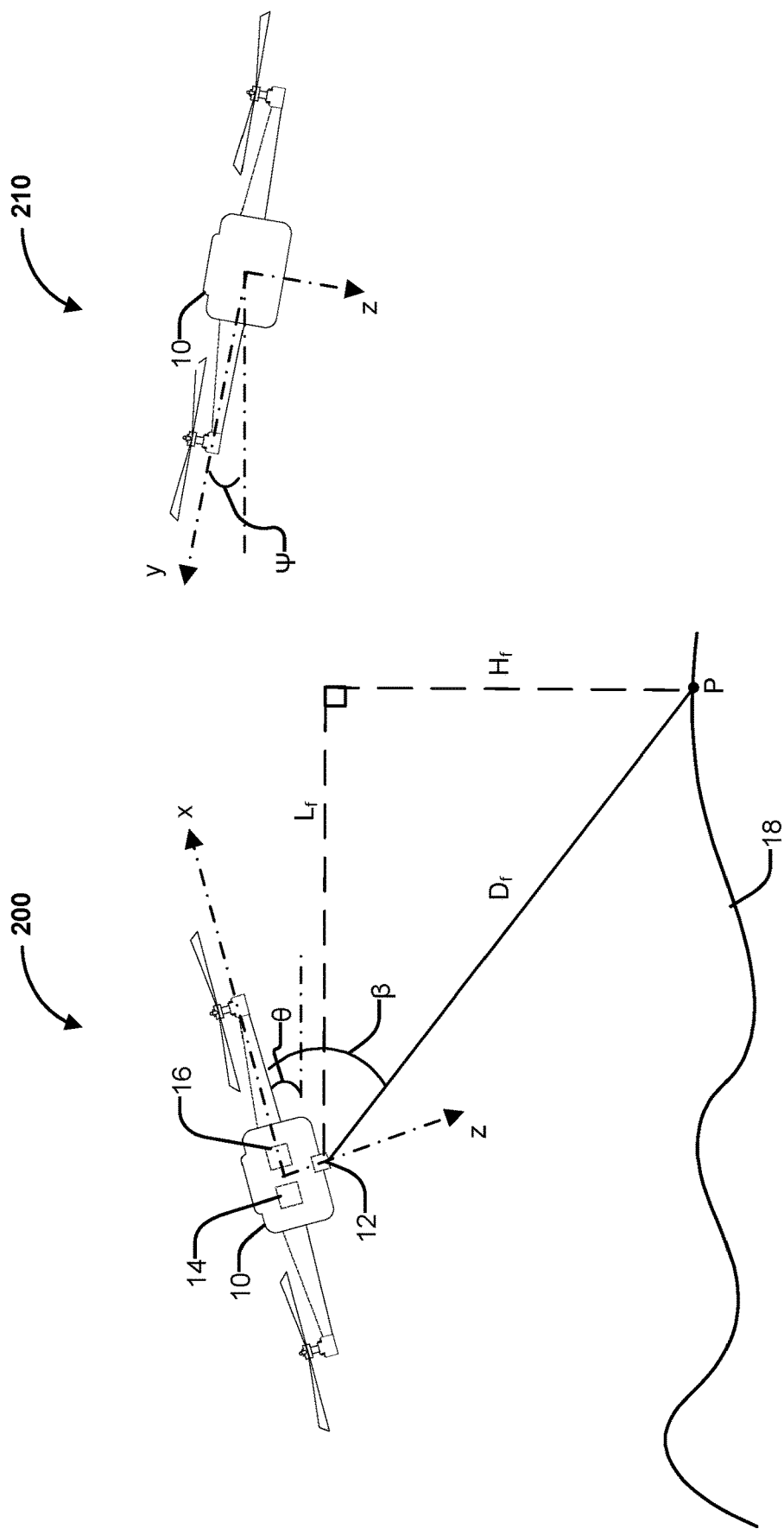
FIG. 2 is a diagram illustrating an embodiment of a height estimation and control system onboard an aerial vehicle in flight.

FIG. 2 is a diagram illustrating an embodiment of a height estimation and control system onboard an aerial vehicle in flight. In FIG. 2, the UAV 10 is shown midflight, traveling forward in the right-hand direction, over terrain 18. This terrain 18 outlines any terrain/ground features including a wide variety of landscapes, flat ground, hills, plants, trees, crops, orchards, vineries, fences, bushes, trees, buildings, obstacles, etc. View 200 shows a side view of the UAV 10 and View 210 shows the front view of the UAV 10 (e.g., looking from the front of the UAV). The x, y, and z axes shown are relative to the body of the UAV 10. As shown in view 200, the x-axis is pointing towards the front of the UAV and the z-axis is pointing downward. When the UAV is viewed from the front as shown in view 210, the y-axis is pointing towards the left of the UAV. The UAV pitch motion is around its y-axis, and the roll motion is around its x-axis. The angles $\theta$ and $\psi$ correspond to the UAV's pitch angle and roll angle, respectively.

In the shown embodiment, the distance sensor 12 is mounted and positioned on the UAV 10 so that the measured distance $D_f$ is at a pre-determined (e.g., fixed) forward-downward angle $\beta$ with respect to the UAV-relative axes. For example, the distance sensor 12 may include a LIDAR (radar or ultrasonic in other embodiments) sensor installed on the UAV 10 at the pre-determined forward-downward angle $\beta$ with respect to the UAV body-relative axes. In Euler angle convention, the forward-downward angle $\beta$ is a negative value. As a result, the distance $D_f$ measured by the distance sensor 12 is between the UAV 10 and a position P, which is on a feature of the ground 18 in front of the drone's current horizontal position. Alternatively, the distance sensor 12 may include a radar sensor or an ultrasonic sensor which is mounted on the UAV 10 at the pre-determined forward-downward angle $\beta$ to provide the distance measurement $D_f$.

The motion sensor 14 measures the pitch angle ($\theta$) of the UAV 10. The motion sensor 14 may comprise an inertial measurement unit (IMU), which directly measures the acceleration of the UAV and determines the pitch angle of the UAV based on the acceleration measurements. Alternatively, the motion sensor 14 may comprise two Real Time Kinematic (RTK) Global Position System (GPS) units and compute the pitch angle based on two position measurements from the two RTK GPS units. Both the distance sensor 12 and the motion sensor 14 are connected to the processing unit 16, as shown in FIG. 2. The processing unit 16 receives measurements from the at least two sensors and calculates the UAV's relative height $H_f$, above the terrain feature, based on the distance $D_f$, the pitch angle $\theta$, and the pre-determined forward-downward angle $\beta$.

Figure 3:
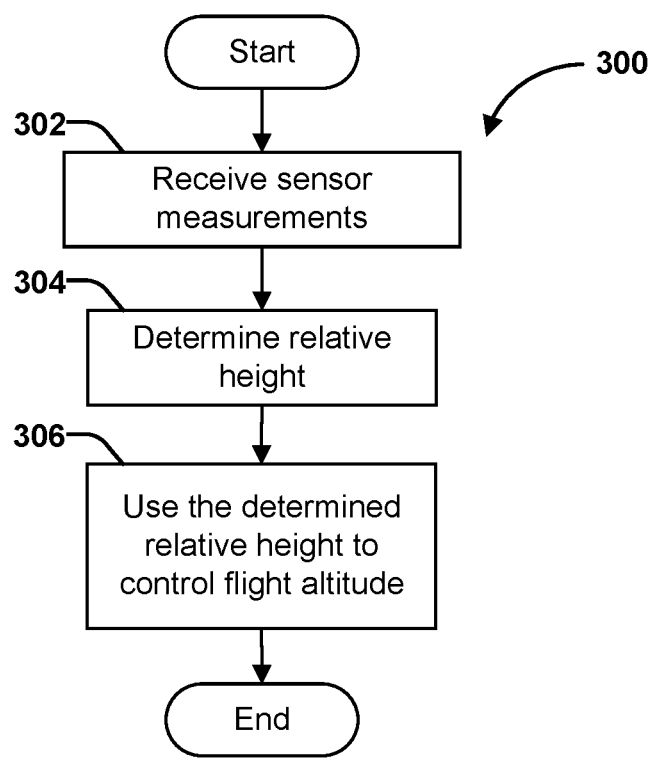
FIG. 3 is a flowchart illustrating an embodiment of a process for estimating a relative height of a terrain feature.

FIG. 3 is a flowchart illustrating an embodiment of a process for estimating a relative height of a terrain feature. The process of FIG. 3 may be executed by the processing unit 16, or more specifically, the height estimation module 17 in the processing unit 16 in various embodiments. The process of FIG. 3 may be repeated periodically and/or dynamically. Process 300 starts with receiving distance measurement $D_f$ from a distance sensor and pitch angle $\theta$ from a motion sensor (e.g., sensor 14 of FIGS. 1 and 2) in step 302. In step 304, a relative height of a terrain feature relative to an aerial vehicle is determined. For example, the relative height is computed based on angular/geometric relationships of the distance measurement with respect to the relative height of the terrain feature given the measured pitch angle $\theta$ and known position angle $\beta$ of the distance sensor. Given the relationships shown in FIG. 2, relative height $H_f$ of the terrain feature located at location point P can be calculated by: $H_f=D_f*\sin(|\theta+\beta|)$. Optionally, the processing unit 16 may also compute horizontal forward distance $L_f$ from a horizontal location of the aerial vehicle to the location of the terrain feature (e.g., from horizontal location of UAV 10 to position P as represented in FIG. 2). The calculation for $L_f$ may be calculated as follows: $L_f=D_f*\cos(|\theta+\beta|)$.

It is worth noting that position P shown as an example on FIG. 2 is not a fixed position on the terrain/ground for every iteration of the process of FIG. 3. As the UAV flies forward, this position P moves, and it is ahead of the UAV by the forward distance $L_f$. As shown in FIG. 2, $H_f$ is the relative height of the UAV above position P ahead of the UAV; that is, this relative height is the UAV's height above the terrain feature located at position P on an upcoming flight path. Thus, this relative height contains information regarding the upcoming terrain. For example, if the terrain ahead is sloping up, the relative height value $H_f$ in front of the UAV at distance $L_f$ will start decreasing if the UAV maintains the same flight altitude. In response to the changing relative height value of the terrain features ahead of the UAV, the UAV may be controlled to adjust its flight altitude to maintain a consistent relative height as new $H_f$ values are continually being calculated in the flight path of the UAV. Thus, by controlling the UAV to maintain a consistent height $H_f$, the UAV will follow the terrain elevation change. Such capability to respond to upcoming terrain elevation changes is critical for close-to-ground terrain following applications such as aerial applications (e.g., crop dustings).

In some embodiments, the motion sensor 14 may also measure and provide a roll angle $\psi$ of the UAV (e.g., shown in FIG. 2). Given the roll angle $\psi$, determining the relative height includes calculating the relative height $H_f$ by performing the following calculation: $H_f=D_f*\cos(\psi)*\sin(|\theta+\beta|)$. Similarly, the forward distance $L_f$ can be computed as: $L_f=D_f*\cos(\psi)*\cos(|\theta+\beta|)$.

Figure 4:
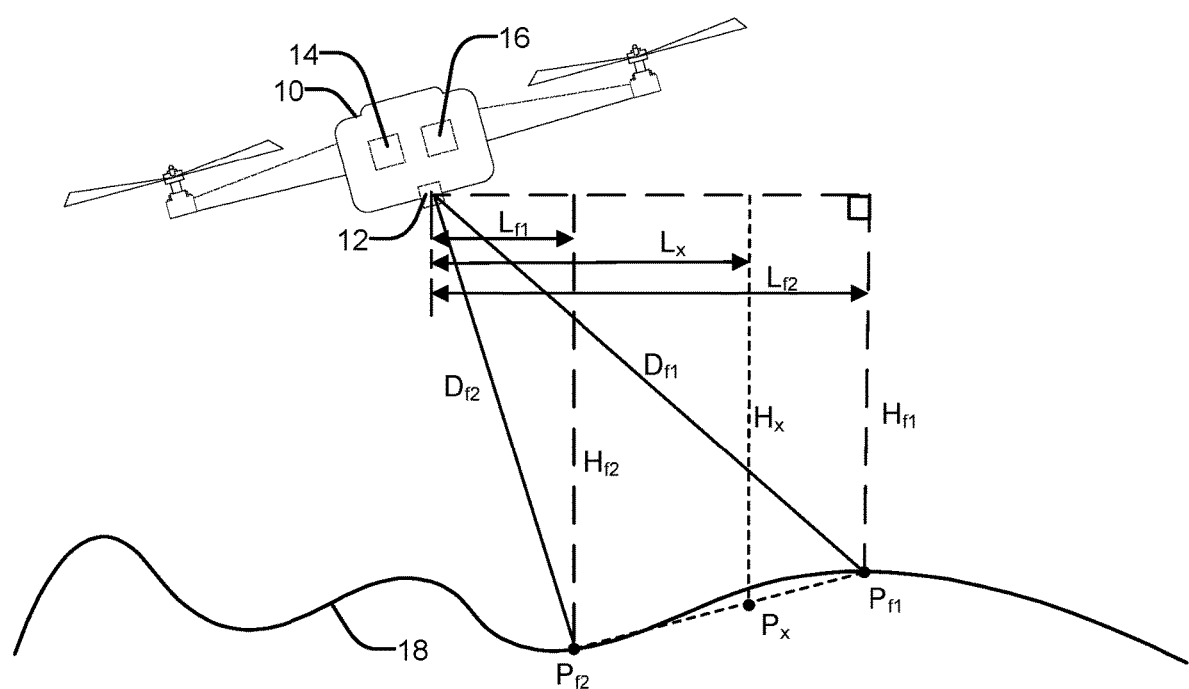
FIG. 4 is a diagram illustrating an embodiment of determining height at the look-forward distance based on two distance measurements.

In some embodiments, the distance sensor 12 in FIG. 2 may include at least two LIDAR (or radar, or ultrasonic) sensors each installed to measure distance from different angles. In the example of two distance sensor components/modules, two different pre-determined forward-downward angles $\beta_1$ and $\beta_2$ (e.g., fixed preset installation angles) are utilized by the distance sensor components. Thus, each sensor component provides its corresponding measurement of the distance from the UAV to a position on the terrain feature in front of the UAV's current lateral position. The processing unit 16 receives the corresponding distance measurements $D_{f1}$ and $D_{f2}$, corresponding to angles $\beta_1$ and $\beta_2$, and calculates the corresponding $H_{f1}=D_{f1}*\sin(|\theta+\beta_1|)$ and $H_{f2}=D_{f2}*\sin(|\theta+\beta_2|)$, and combines them to derive the UAV's relative height above terrain features. In some embodiments, combining the distance measurements includes calculating a linear combination, e.g., $H=(H_{f1}+H_{f2})/2.0$. In some embodiments, combining the distance measurements includes calculating a weighted combination, e.g., $H=a*H_{f1}+(1-a)*H_{f2}$, where $0\leq a\leq 1$. In some embodiments, combining the distance measurements includes selecting a smaller value among the distance measurements, e.g., $H=\min(H_{f1}, H_{f2})$. In some embodiments, a look-forward distance $L_x$ may be selected and the relative height is estimated as the height at the look-forward distance based on the plurality of distance measurements. FIG. 4 is a diagram illustrating an embodiment of determining height $H_x$ at the look-forward distance $L_x$ based on the two distance measurements $D_{f1}$ and $D_{f2}$. For each distance measurement, the corresponding forward distance may be computed using the calculation: $L_{f1}*\cos(|\theta+\beta_1|)$ and $L_{f2}=D_{f2}*\cos(|\theta+\beta_2|)$. Assuming $|\beta_1|<|\beta_2|$, $L_{f1}>L_{f2}$. The height at the look-forward distance $L_x$ may be estimated as:

$$H=H_x=H_{f2}+(L_x-L_{f2})*(H_{f1}-H_{f2})/(L_{f1}-L_{f2}).$$

Note that the resultant $H_x$ is the relative height above P, which is on the line connecting $P_{f1}$ and $P_{f2}$ instead of on the terrain feature outline 18. Therefore, $H_x$ is an approximation of the actual height at the look-forward distance $L_x$.

Returning to FIG. 3, in step 306, the determined relative height is utilized to control a flight altitude. For example, a flight control command to adjust a flight height/altitude of an aerial vehicle is sent based on the determined relative height to maintain a consistent flight height (e.g., within a range) over the terrain/ground features when the aerial vehicle is flying over the terrain/ground. By continually repeating the process of FIG. 3 and adjusting the flight height of the aerial vehicle based on the determined relative height of ground/terrain features detected in front of the aerial vehicle on its flight path, the aerial vehicle is able to automatically follow the vertical changes in ground/terrain features to maintain a relatively consistent flight height over the features of the ground/terrain. This may be useful when spraying pesticides/fertilizers on crops planted on the ground/terrain using a UAV to ensure efficient and safe application of the pesticide/fertilizer at a relatively consistent height over the crops without the need for an operator to constantly adjust the flight height of the UAV manually.

In some embodiments, controlling the flight altitude includes determining an amount of altitude increase or decrease required to maintain a consistent flight height over ground/terrain features. For example, a difference between a current relative height (e.g., distance between current vertical position of UAV and a terrain feature directly below the UAV) and the determined relative height (e.g., determined in 304) to be utilized to control a flight altitude is calculated and utilized as the amount of altitude increase or decrease indicated in the flight control command (e.g., increase/decrease from current vertical altitude) to lower (e.g., current relative height is less than the determined relative height) or raise (e.g., current relative height is greater than the determined relative height) the flight height/altitude of an aerial vehicle. In some embodiments, the distance between the UAV and a terrain feature beneath the UAV must be at least a configured minimum distance and/or within a configured range and the controlling the flight altitude includes providing an instruction to increase or decrease a flight height/altitude of the aerial vehicle such that the minimum distance and/or within the range will be maintained when controlling the flight altitude.

Figure 5:
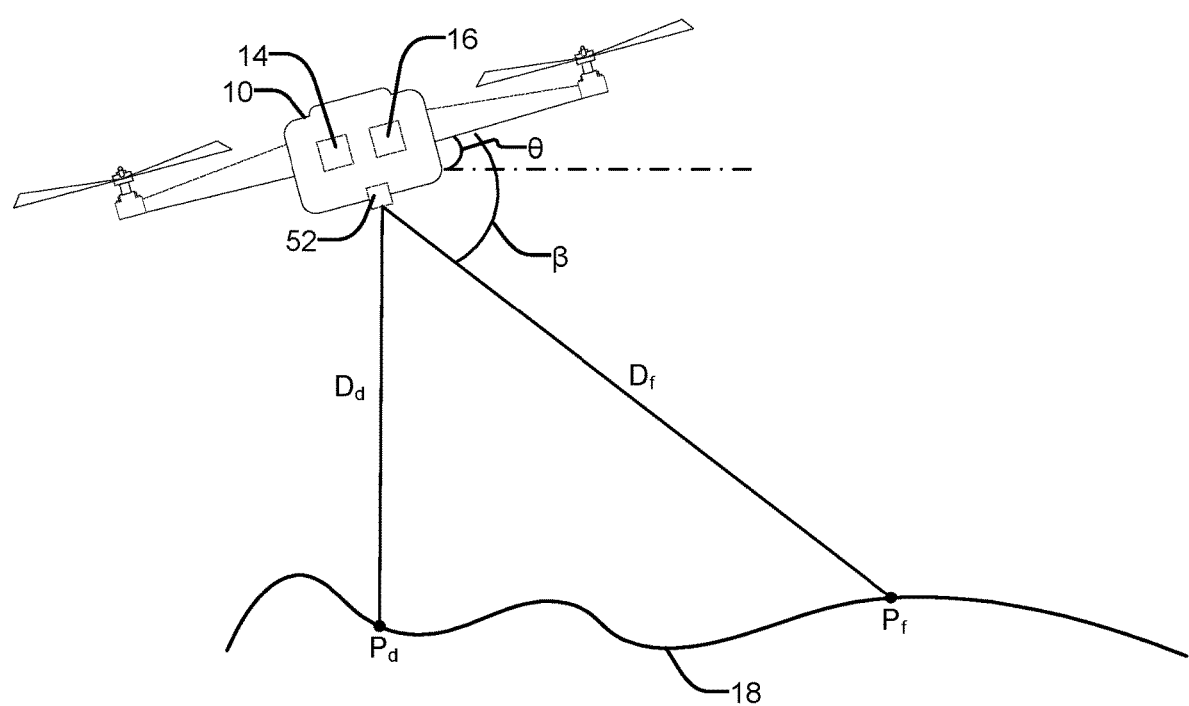
FIG. 5 is a diagram illustrating an embodiment of using a plurality of different sensors to measure distance to terrain features.

FIG. 5 is a diagram illustrating an embodiment of using a plurality of different sensors to measure distance to terrain features. Distance sensor 52 shown in FIG. 5 includes an ultrasonic sensor in addition to a LIDAR or radar sensor. The ultrasonic sensor is installed facing downward on UAV 10 towards the ground so as to measure a distance $D_d$ from the UAV 10 to the ground directly under it. Because the ultrasonic sensor is facing directly downward, the distance $D_d$ is $H_d$ (the height of the UAV 10 above the ground right under it), The processing unit 16 connected to the distance sensor 52 receives both the forward-downward distance measurement $D_f$ and the distance measurement $D_d$ from the ultrasonic sensor. It calculates $H_f$ from $D_f$ and integrates $H_f$ and $H_d$ ($H_d=D_d$) to determine the height of the UAV 10 above the ground. The integration may be a linear combination, e.g., a simple averaging: $H=(H_f+H_d)/2.0$ or a minimal value may be selected, e.g., $H=\min(H_f, H_d)$.

In yet another further embodiment, the distance sensor includes an ultrasonic sensor and at least one LIDAR (or radar) sensor and the motion sensor 14 further provides a forward velocity, $v_x$, of the UAV 10 in addition to the pitch angle $\theta$. The ultrasonic sensor installed on the UAV 10 faces downward and measures the distance $D_d$ from the UAV to the ground directly under it. The LIDAR (or radar) sensor is installed at a pre-determined forward-downward angle $\beta$ to measure a distance $D_f$ to a position on the ground and in front of the UAV 10. The motion sensor 14 may comprise an IMU and a positioning system, such as a Global Positioning System (GPS). The IMU directly measures the acceleration of the UAV and determines the pitch angle of the UAV based on the acceleration measurements. In addition to the position measurements, the GPS system provides the UAV position measurements as well as the velocities and travel direction of the UAV. The motion sensor integrates the IMU measurements with the GPS position and velocity measurements to provide the forward, lateral, and upward velocities of the UAV. The processing unit 16 receives the distance measurements from the distance sensor, the pitch angle and forward velocity from the motion sensor, and determines the UAV's relative height over terrain features.

Figure 6:
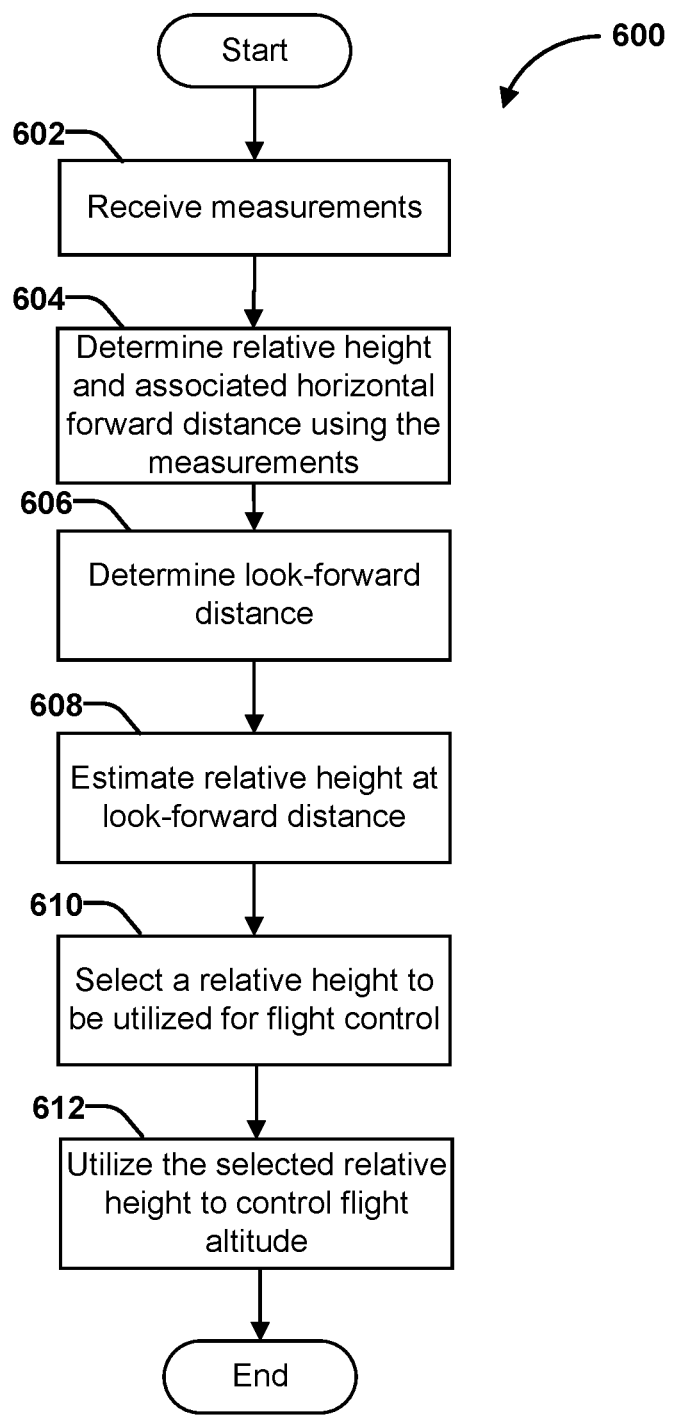
FIG. 6 is a flowchart illustrating an embodiment of a process for estimating a relative height of a terrain feature at a look forward distance.

FIG. 6 is a flowchart illustrating an embodiment of a process for estimating a relative height of a terrain feature at a look-forward distance. The process of FIG. 6 may be executed by the processing unit 16, or more specifically, the height estimation module 17 in the processing unit 16 in various embodiments. The process of FIG. 6 may be repeated periodically and/or dynamically. Process 600 starts with receiving the measurements from the distance sensor 52 and the motion sensor 14 in step 602.

In step 604, the process computes relative height and forward distance for each distance measurement. For example, for the measurement from the ultrasonic sensor, $H_d=D_d$ and the forward distance $L_d=0$; for the measurements from the distance sensor, $H_f=D_f*\sin(|\theta+\beta|)$ and the forward distance $L_f=D_f*\cos(|\theta+\beta|)$. Subsequently in step 606, a look-forward distance Lx is determined based on the forward velocity $v_x$. For example, the look-forward distance $L_x$ can be computed as: $L_x=T_x*v_x$, where $T_x$ is a pre-defined look-forward time. The look-forward distance $L_x$ identifies the amount of horizontal forward distance from the aerial vehicle where a relative height of a terrain feature is desired to be determined to allow the aerial vehicle to adjust its flight height relative to the height of the terrain feature located at or within $L_x$. Given the variance in amount of distance and travel required to change the flight height due to different vehicle speeds, by basing $L_x$ on the forward velocity of the aerial vehicle, $L_x$ becomes larger with increased velocity and smaller with decreased velocity. The look-forward time $T_x$ may be determined based on characteristics of the aerial vehicle (e.g., weight, design, model, application, attached accessories, etc.), flight control system (e.g., type, version, etc.), environmental factors, and/or user configuration. For example, if the UAV is agile (the UAV's flight control is responsive), the look-forward time $T_x$ may be smaller since the UAV can raise or lower itself in a relatively short time. On the other hand, if the UAV's response is slow, the look-forward time $T_x$ may be larger since it takes more time for the UAV to raise or lower itself. Exemplary values for $T_x$ can range from 0.5 seconds to 3 seconds. Alternatively, in some embodiments, look-forward distance $L_x$ is bounded by a minimum value $L_{min}$, e.g., $L_x=\max(T_x*V_x, L_{min})$. For example, if the forward speed is small, $L_x$ is set as the minimum value $L_{min}$.

In step 608, the relative height at the look-forward distance is estimated. For example, the relative height of the terrain feature at the look-forward distance is calculated based on the look-forward distance $L_x$, the calculated heights (e.g., $H_f$ and $H_d$), and forward distances (e.g., $L_f$ and $L_d$). In some embodiments, linear interpolation of the $H_f$ and $L_f$ pair and the $H_d$ and $L_d$ pair is calculated to determine $H_x$: $H_x=H_d+(L_x-L_d)*(H_f-H_d)/(L_f-L_d)$ when $(L_f-L_d)\neq 0$; in case $(L_f-L_d)=0$, simple averaging may be used: $H_x=(H_f+H_d)/2$, in example shown in FIG. 4, $H_x=H_{f2}+(L_x-L_{f2})*(H_{f1}-H_{f2})/(L_{f1}-L_{f2})$.

In step 610, a relative height estimate to be utilized for flight control is selected. For example, the relative height determined in 608 is utilized as one of a plurality of possible relative height estimate choices. For example among $H_x$ and $H_d$, a minimum value is selected such that $H=\min(H_x, H_d)$.

Thus, the UAV's relative height estimate to be utilized for flight control within the look-forward distance $L_x$ from the horizontal location of the aerial vehicle may be selected as the minimum relative height estimate among the choices for distances within the look-forward distance $L_x$ from the horizontal location of the aerial vehicle. Using a smaller relative height estimate will cause the aerial vehicle to fly higher (e.g., to compensate for the larger terrain feature height that caused the relative height estimate to be smaller), ensuring a safer flight at a higher flight height.

In step 612, the selected relative height is utilized to control flight altitude. For example, a flight control command to adjust a flight height/altitude of the aerial vehicle is sent based on the determined relative height to maintain a consistent flight height (e.g., within a range) over the terrain/ground features when the aerial vehicle is flying over the terrain/ground. In some embodiments, controlling the flight altitude includes determining an amount of altitude increase or decrease required to maintain a consistent flight height over ground/terrain features. For example, a difference between a current relative height (e.g., distance between current vertical position of UAV and a terrain feature directly below the UAV) and the selected relative height (e.g., selected in 610) to be utilized to control a flight altitude is calculated and utilized as the amount of altitude increase or decrease indicated in the flight control command (e.g., increase/decrease from current vertical altitude) to lower (e.g., current relative height is less than the selected relative height) or raise (e.g., current relative height is greater than the selected relative height) the flight height/altitude of an aerial vehicle. In some embodiments, the distance between the UAV and a terrain feature beneath the UAV must be at least a configured minimum distance and/or within a configured range and the controlling the flight altitude includes providing an instruction to increase or decrease a flight height/altitude of the aerial vehicle such that at least the minimum distance and/or the range will be maintained when controlling the flight altitude.

Figure 7:
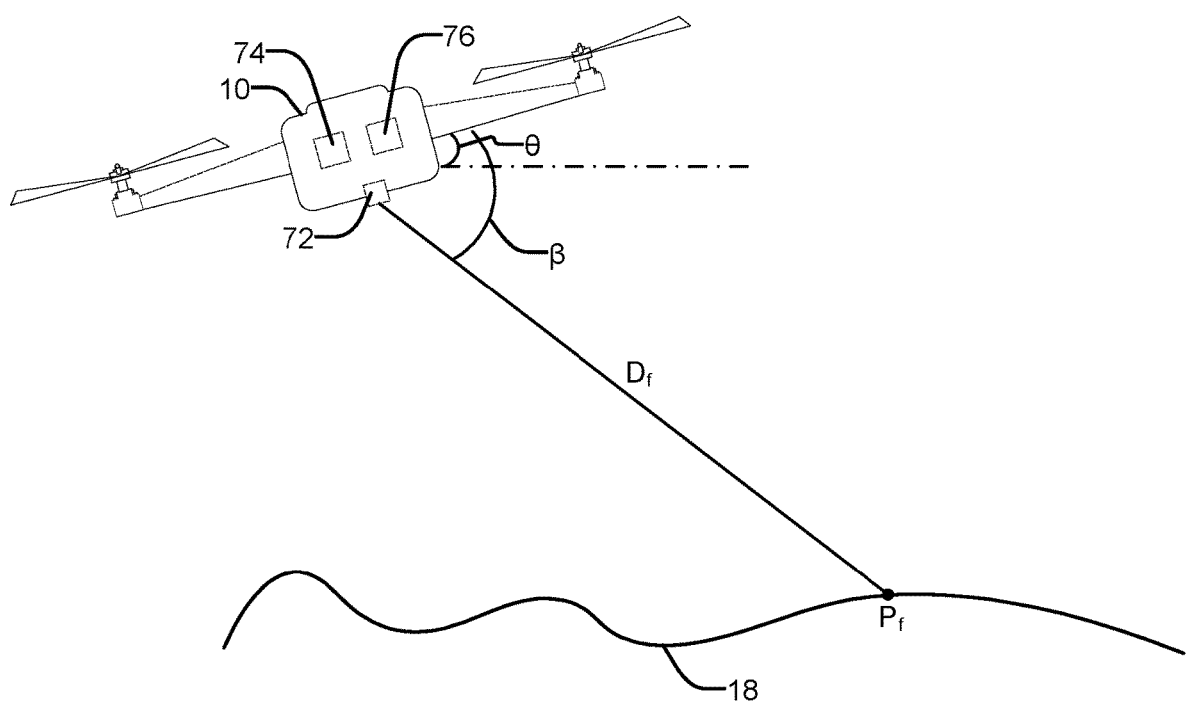
FIG. 7 is a diagram illustrating an embodiment of a height estimation system for building a profile of relative heights.

FIG. 7 is a diagram illustrating an embodiment of a height estimation system for building a profile of relative heights. The height estimation system comprises a distance sensor 72, a motion sensor 74, and a processing unit 76. The distance sensor 72 may comprise a LIDAR or radar or ultrasonic sensor, which is installed at a pre-determined forward-downward angle β with respect to the axes of the UAV 10. Distance sensor 72 measures a distance $D_f$ between the UAV 10 and a position $P_f$ ahead of the UAV of a feature on the terrain feature outline 18. The motion sensor 74 may comprise an IMU and a positioning system such as a GPS to detect the pitch angle (θ) of the UAV, the position of the UAV including its altitude, and the traveling speed of the UAV. The processing unit 76 is connected to both the distance sensor 72 and the motion sensor 74. It receives the measurements of the sensors and builds a profile of relative height difference between the vertical height of the UAV and the vertical height of terrain features.

Figure 8:
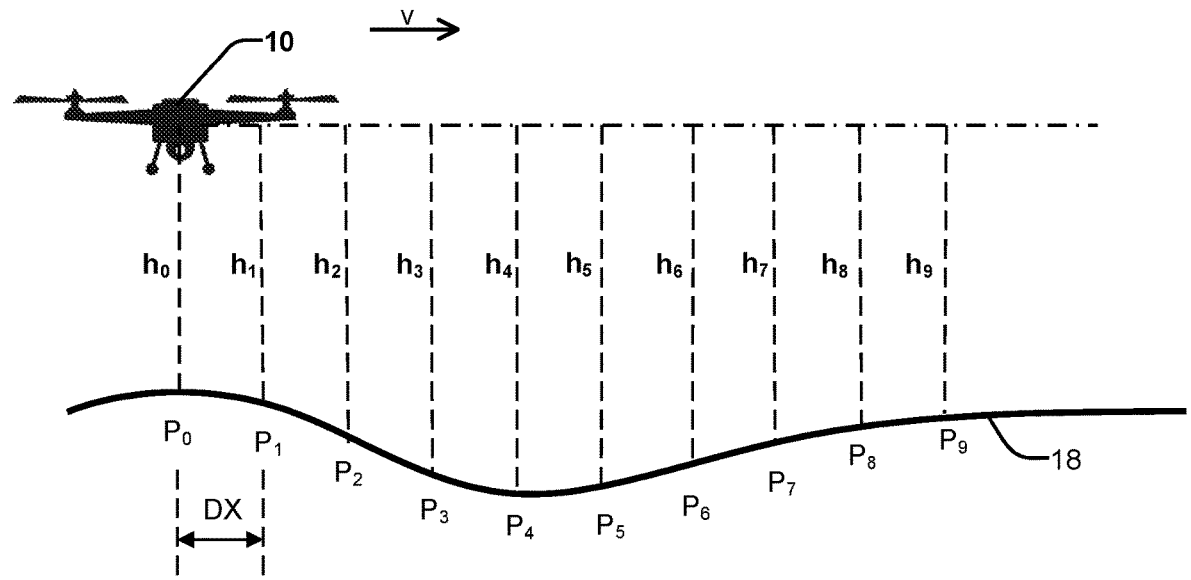
FIG. 8 is a diagram illustrating an example profile of relative heights at interval horizontal distances.

FIG. 8 is a diagram illustrating an example profile of relative heights at interval horizontal distances. For example, the profile of relative heights is utilized by the UAV 10 as it is flying over a terrain 18 at a time instance $t_0$. The relative height profile consists of a set of relative height values, $h_0, h_1, h_2, \ldots$, each of which corresponds to a difference between UAV's current height and a height of a ground (or terrain) feature at the associated location ahead of the UAV. In some embodiments, the relative height profile is represented as an array, (e.g., hProfile array) and its length can be fixed or varying. The relative height profile shown in FIG. 8 has a length of N=10, and its values are hProfile=[$h_0, h_1, h_2, \ldots h_9$].

As illustrated, $h_0$ is the current height of the UAV in relation to $P_0$, the terrain feature directly beneath it; $h_1$ is the UAV's height distance above $P_1$, the terrain feature at a distance DX ahead of the horizontal location of the UAV, $h_2$ is the UAV's height distance above $P_2$, the terrain feature at a further distance ahead of the horizontal location of the UAV, and so on. For example, hProfile($t_0$)=[5, 6, 8, 9, 10 . . . ] means that the UAV is 5 m above $P_0$, 6 m above $P_1$, 8 m above $P_2$, etc. The horizontal spacing/distance between the terrain feature positions ($P_0, P_1, P_2$, etc.) does not have to be constant and can vary between different feature positions. For simplicity of the description, the positions are equally spaced with pre-determined distances DX. Therefore, the distance between any terrain feature position point $P_i$ and the UMv's current ground position $P_0$ is equal to i*DX.

Figure 9:
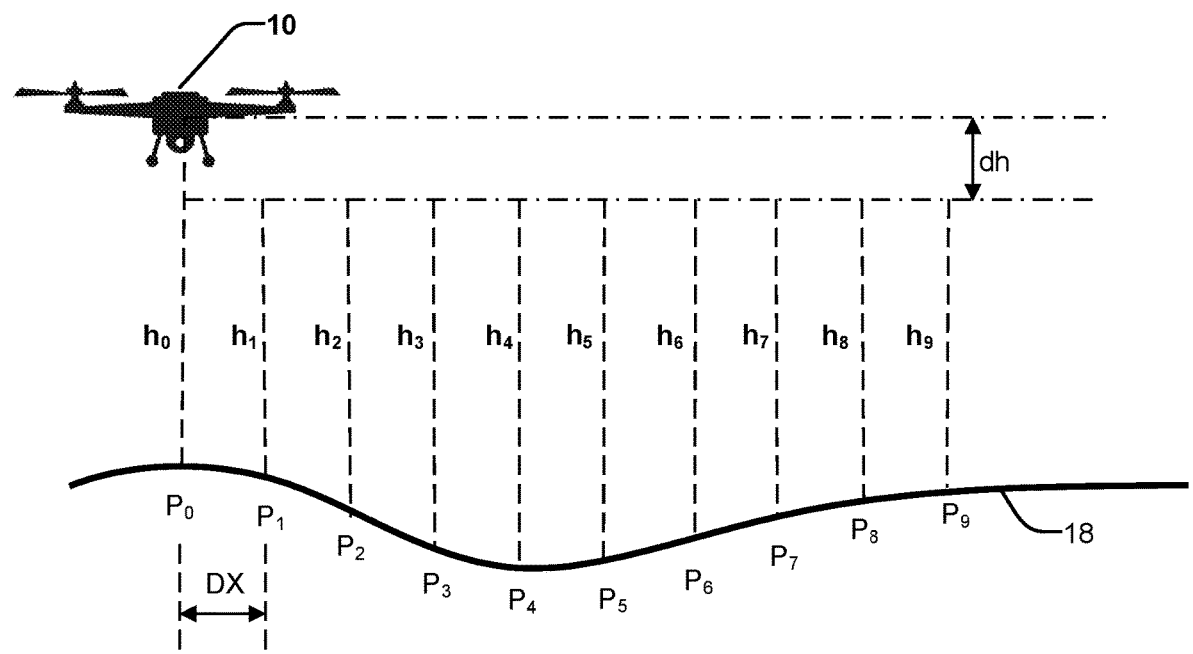
FIG. 9 is a diagram illustrating an example change to the profile of relative heights at forward interval horizontal distances after vertical movement of the UAV from the initial location shown in FIG. 8.

FIG. 9 is a diagram illustrating an example change to the profile of relative heights at forward interval horizontal distances after vertical movement of the UAV from the initial location shown in FIG. 8. For example, FIG. 8 shows the position of the UAV 10 at time instance $t_0$ and FIG. 9 shows the position of the UAV 10 at a subsequent time instance $t_1$ when the UAV is still on top of position $P_0$ but has changed in altitude by dh. Because the motion sensor 74 provides altitude measurements, this change in altitude can be detected by comparing the altitude measurement (provided by motion sensor 74) at time $t_0$ with the altitude measurement at time $t_1$. When a new altitude measurement is detected, the UAV 10 modifies each element of its profile of relative heights (e.g., elements of hProfile) accordingly. The relative height above each position can be updated as $h_i(t_1)=h_i(t_0)+dh$. For example, hProfile($t_1$)={$h_0(t_0)+dh, h_1(t_0)+dh, h_2(t_0)+dh, h_3(t_0)+dh, \ldots, h_9(t_0)+dh$}. Thus, if $dh(t_1)=2$ m and hProfile($t_0$)=[5, 6, 8, 9, 10 . . . ], hProfile($t_1$) is $$h\text{Profile}(t_1)=h\text{Profile}(t_0)+dh(t_1)=[5+2,6+2,8+2,9+2, 10+2 \ldots ]=[7,8,10,11,12, \ldots ].$$

Similarly, if from time instance $t_1$ to time instance $t_2$, the UAV 10 is still hovering on top of position $P_0$, but drops in altitude by $dh(t_2)=-3$ m, the new relative height profile would be:

$$h\text{Profile}(t_2)=h\text{Profile}(t_1)+dh(t_2)=[7-3,8-3,10-3,11-3,12-3,\ldots]=[4,5,7,8,9,\ldots].$$

For simplicity, we are assuming that the UAV is not moving horizontally, and is only moving in the vertical direction. Hence, we can derive the following equation if the UAV only changes in altitude between two time instances:

$$h\text{Profile}(t_{k+1})=h\text{Profile}(t_k)+dh(t_{k+1}), \text{ where } dh(t_{k+1})=\text{altitude}(t_{k+1})-\text{altitude}(t_k).$$

Figure 10:
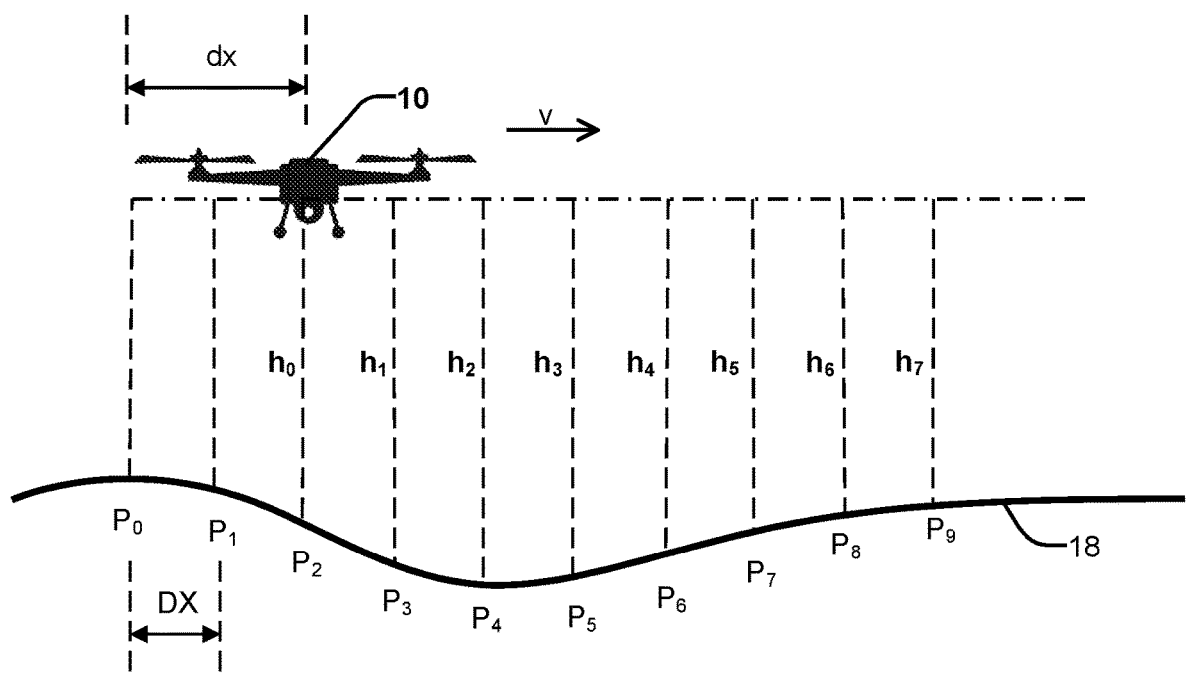
FIG. 10 is a diagram illustrating an example change to the profile of relative heights at forward interval horizontal distances after horizontal movement of the UAV from the location shown in FIG. 9.

FIG. 10 is a diagram illustrating an example change to the profile of relative heights at forward interval horizontal distances after horizontal movement of the UAV from the location shown in FIG. 9. For example, FIG. 9 shows the position of the UAV 10 at time instance $t_1$ and FIG. 10 shows the position of the UAV 10 at a third time instance $t_3$. From time instance $t_2$ shown in FIG. 9 to time instance $t_3$ shown in FIG. 10, the UAV travelled a distance dx without a change in altitude. Assuming the travel distance dx is twice of DX (i.e., dx=2*DX) as illustrated in FIG. 10, the UAV is now over terrain feature position $P_2$. Because the first element $h_0(t_3)$ in the relative height profile array hProfile($t_3$) represents the relative height of the UAV 10 in relation to the terrain feature directly beneath it, $h_0(t_3)$ now represents the UAV's height above $P_2$. Therefore, $h_0(t_3)=h_2(t_2)$.

Similarly, the second element $h_1(t_3)$ of the relative height profile array hProfile($t_3$) represents the UAV's height above $P_3$, a position at DX ahead of the UAV, $h_1(t_3)=h_3(t_2)$. Given that previously at time instance $t_2$ the UAV 10 had the following relative height profile (as previously discussed with FIG. 9):

$$h\text{Profile}(t_2)=[h_0(t_2),h_1(t_2),h_2(t_2),\ldots]=[4,5,7,8,9,\ldots],$$

the updated relative height profile at time instance $t_3$ would be as follows:

$$h\text{Profile}(t_3)=[h_0(t_3),h_1(t_3),\ldots]=[h_2(t_2),h_3(t_2),h_4(t_2),\ldots].$$

That is, hProfile($t_3$)=hProfile($t_2$)<<n, where the operating symbol "<<" means shifting the elements of an array to the left, n is the shift number, and "<<n" represents shifting the elements by n elements. In this particular case, the shift number n=floor(dx/DX)=2, meaning shifting the elements of hProfile($t_2$) left by two elements. (Function floor(a) is to get the integer part of a.) For cases where the UAV is traveling backwards instead of forwards, dx is negative and the relative height profile array should instead shift to the right: hProfile($t_3$)=hProfile($t_2$)>>n, where n=floor(|dx|/DX) and ">>" represents shifting the elements of an array to the right.

Thus, the profile of relative heights at various distances away from the aerial vehicle may be updated based on the distance traveled by the aerial vehicle. For example, the relative height profile array (e.g., hProfile) may be updated by a shifting of the existing elements in the array. Because $h_0$ of the profile should always represent the height of the UAV in relation to the ground position directly beneath it, the elements of relative height profile will shift left as the UAV moves forward. Because updating the profile based on travel distance does not add new elements to the profile, the length of the profile will change each time it is updated. For simplicity, FIG. 10 and related description assumed that DX is constant (e.g., the distance between any two adjacent position points corresponding to the profile is equal). However, in various embodiments, the horizontal distance between any two adjacent elements in the profile of relative heights at various distances may vary across different adjacent elements.

In these embodiments, the profile array will only shift over an element when the aerial vehicle has traveled past the horizontal distance represented by the element. In other words, if the UAV is halfway between $P_5$ and $P_6$, the profile array elements of hProfile will still account for any altitude change, but the profile array elements will not be shifted until the UAV reaches a horizontal distance corresponding to $P_6$.

Hence, we can derive the following equation if, from time instance $t_k$ to time instance $t_{k+1}$, the UAV travelled forward by a distance of dx (dx>=0) without changing its altitude:

$$h\text{Profile}(t_{k+1})=h\text{Profile}(t_k)<<n, \text{ where } n=\text{floor}(dx/DX).$$

After this update, the travel distance dx should be reset to be dx=dx−n*DX to prepare for the next time instance.

More realistically, as the UAV is flying, both its vertical and horizontal positions change for a next time interval, and the processing unit 76 updates the profile of relative heights by concurrently updating for the next time interval relative height values corresponding to the vertical position change and shifting any profile elements based on the horizontal position change. Furthermore, as new relative distance measurements are obtained from the distance sensor 72, the processing unit 76 further incorporates the new distance measurements to update the profile of relative heights, an embodiment of which will be further described along with FIG. 11.

Figure 11:
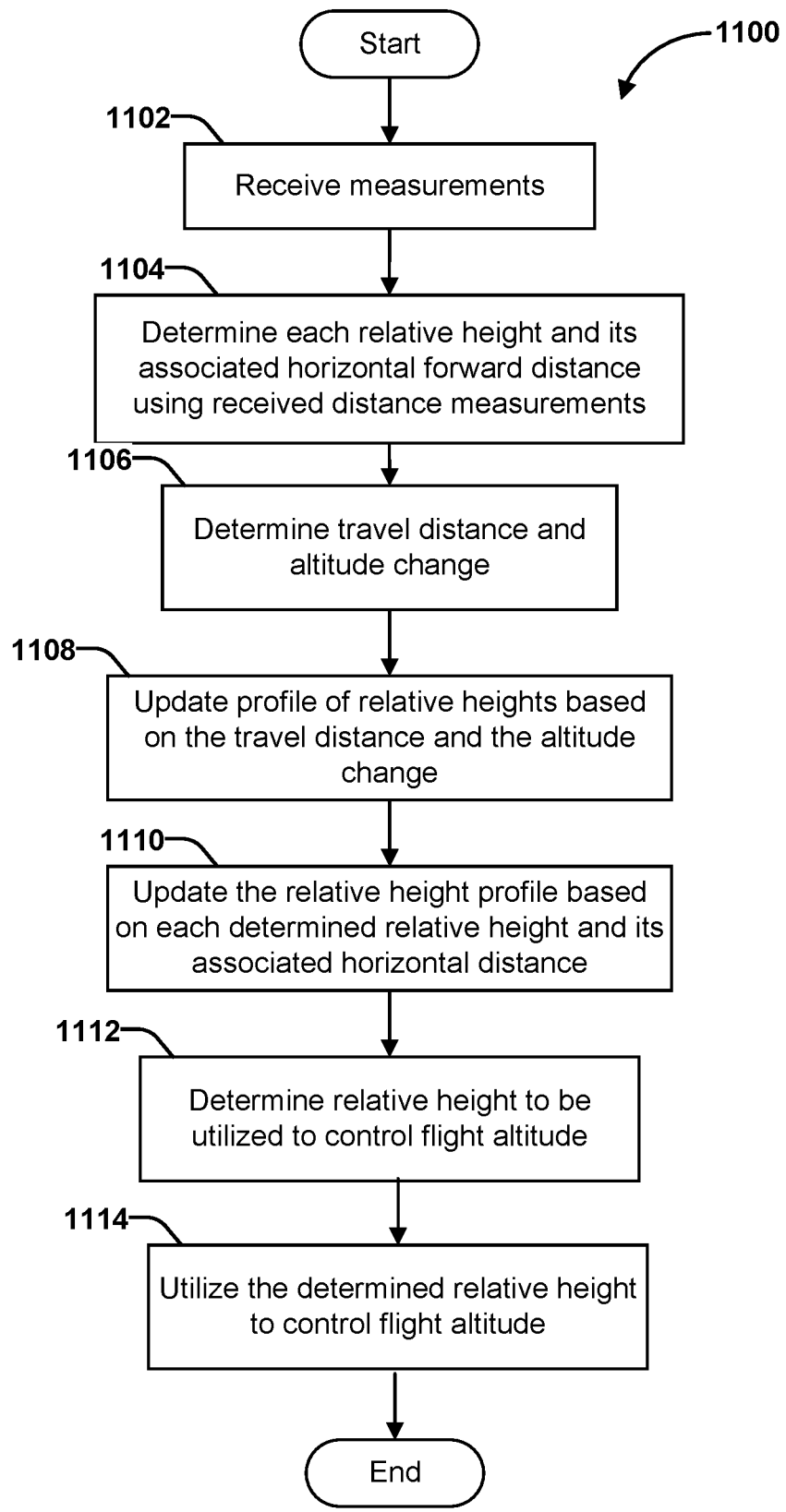
FIG. 11 is a flowchart illustrating an embodiment of a process for building and updating a profile of relative heights of terrain features located in front of an aerial vehicle.

FIG. 11 is a flowchart illustrating an embodiment of a process for building and updating a profile of relative heights of terrain features located in front of an aerial vehicle. The process of FIG. 11 may be executed by the processing unit 16, or more specifically, the height estimation module 17 in the processing unit 16 in the various embodiments. The process of FIG. 11 may be repeated periodically and/or dynamically. For example, each iteration of the process of FIG. 11 is a processing cycle and time $t_k$ is incremented after each iteration. Process 1100 starts at 1102 by receiving the distance measurements from the distance sensor 72 and the pitch angle θ, the forward speed $v_x$, and the altitude measurements from the motion sensor 74.

Subsequently in step 1104, each relative height at its associated horizontal forward distance is determined using the received measurements. As described with FIG. 2, the height $H_f$ and the forward distance $L_f$ are calculated as follows: $H_f=D_f*\sin(|θ+β|)$ and $L_f=D_f*\cos(|θ+β|)$, where θ is the pitch angle from the motion sensor 74 and β is the pre-determined forward-downward angle for installing the LIDAR or radar sensor.

In step 1106, the travel distance and altitude change of the aerial vehicle are determined. In some embodiments, the travel distance $dx(t_k)$ is computed based on the forward velocity $v_x$ detected by the motion sensor 74. For example $dx(t_k)=dx(t_{k-1})+vx*dt$, where dt is the time difference between two processing cycles. If process 1100 is executed in cycles at 100 Hz, then the time difference dt is 0.01 second. The altitude change is calculated by comparing the current altitude measurement from the motion sensor 74 with the previous altitude measurement (e.g., $dh(t_k)=\text{altitude}(t_k)-\text{altitude}(t_{k-1})$).

In step 1108, the determined altitude change (e.g., $dh(t_k)$) and horizontal travel distance (e.g., $dx(t_k)$) are utilized to update the profile of relative heights. As previously described with FIG. 9 and FIG. 10, the profile of relative heights may be updated with the altitude by using the following:

$$h\text{Profile}(t_k) = h\text{Profile}(t_{k-1}) + dh(t_k), \text{ where } dh(t_k) = \text{altitude}(t_k) - \text{altitude}(t_{k-1})$$

In some embodiments, the profile of relative heights is shifted according to the travel distance $dx(t_k)$. For example, after updating the relative height profile, the travel distance $dx(t_k)$ is utilized to remove/shift from the profile, entries corresponding to the amount of horizontal travel and the horizontal travel distance is reset.

If $dx(t_k) \geq 0$, the profile shifts left:

$$h\text{Profile}(t_k) = h\text{Profile}(t_k) \ll n(t_k), \text{ where the shift number } n(t_k) = \text{floor}(dx(t_k)/DX),$$

and the horizontal travel distance is reset as follows:

$$dx(t_k) = dx(t_k) - n(t_k)*DX.$$

If $dx(t_k) < 0$, the profile is shifted right:

$$h\text{Profile}(t_k) = h\text{Profile}(t_k) \gg n(t_k), \text{ where the shift number } n(t_k) = \text{floor}(|dx(t_k)|/DX),$$

and the horizontal travel distance is reset as follows:

$$dx(t_k) = dx(t_k) + n(t_k)*DX.$$

In the case where the shift number $n(t_k)=0$, the relative height profile is not shifted.

Figure 12:
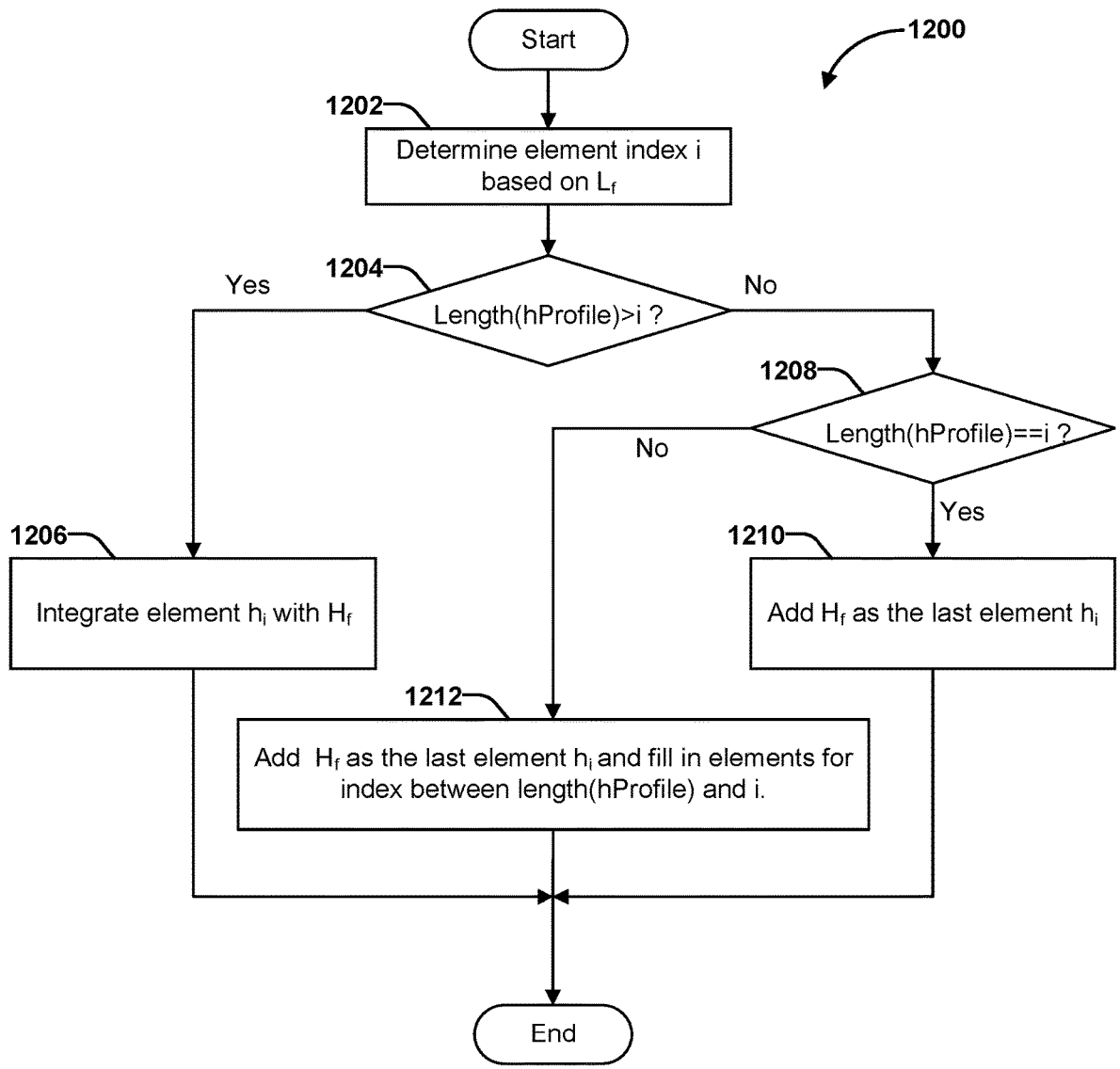
FIG. 12 is a flowchart illustrating an embodiment of at least a portion of a process of updating the relative height profile.
Figure 13:
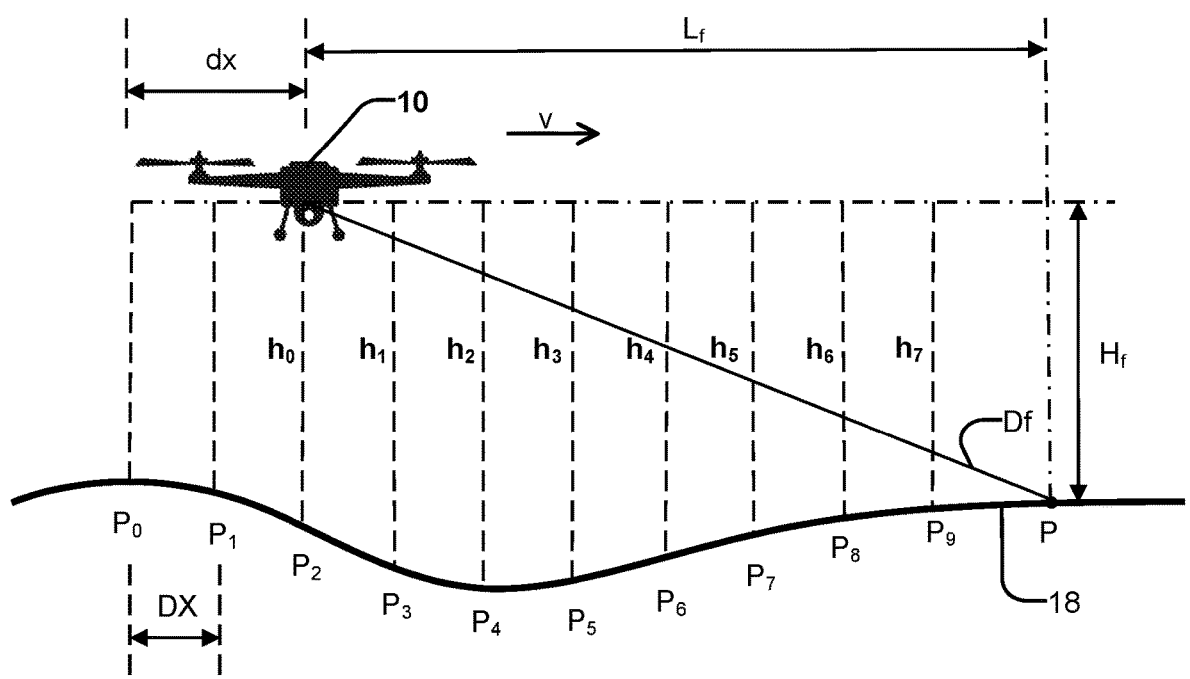
FIG. 13 is a diagram illustrating an example of FIG. 8 along with an illustration of a current distance measurement and its corresponding relative height at its associated horizontal distance.

In step 1110, the relative height profile is updated based on each relative height and its associated horizontal distance determined in step 1104. FIG. 12 is a flowchart illustrating an embodiment of at least a portion of a process of updating the relative height profile. The process of FIG. 12 may be performed in step 1110 of FIG. 11. To assist in the description of step 1110 (e.g., how each H and L are used to update the relative height profile) and process 1200, FIG. 13 is a diagram illustrating an example of the UAV at the same third time instance $t_3$ as the time instance for FIG. 8 with the addition of the illustration of a current distance measurement $D_f$ from the distance sensor together with its corresponding relative height at its associated horizontal distance determined in step 1104. The process of FIG. 12 may be executed by the processing unit 16, or more specifically, the height estimation module 17 in the processing unit 16 of the various embodiments. Process 1200 starts at step 1202 with determining the element index of the relative height profile corresponding to the new relative height $H_f$. The determination is based on the forward distance $L_f$: $i=\text{floor}(L_f/DX)$, where i is the corresponding element index. In the example shown in FIG. 13, $8*DX < L_f < 9*DX$, therefore, the corresponding element index $i=\text{floor}(L_f/DX)=8$. In step 1204, the processing unit 76 then checks if the relative height profile already has values for that element index. One example way is to check the corresponding element index i with the length of the relative height profile.

If $\text{length}(h\text{Profile}(t_k)) > i$, the relative height profile already has an $h_i$. The process 1200 continues to step 1206 to integrate the existing height element $h_i$ with the new height $H_f$. For example, the integration may be a simple linear combination: $h_i = a*h_i + (1-a)*H_f$, where $0 \leq a \leq 1$.

Otherwise (i.e., $\text{length}(h\text{Profile}(t_k)) \leq i$), the existing relative height profile $h\text{Profile}(t_k)$ does not have element $h_i$. (Note that the element index i starts at 0; therefore, if the length of a relative height profile is N, it has elements with index from 0 to (N-1).) The process 1200 further checks whether $\text{length}(h\text{Profile}(t_k)) == i$ in step 1208. If $\text{length}(h\text{Profile}(t_k)) == i$, the relative height profile does not have an element corresponding to element index i but has an element corresponding to element index (i-1), which is adjacent to element index i. Thus, the process 1200 continues to step 1210 to add the new height $H_f$ as the last element $h_i$. As a result, the length of the relative height profile is increased by 1.

If $\text{length}(h\text{Profile}(t_k)) < i$, the relative height profile not only lacks an element corresponding to element index i but also lacks elements adjacent to the element index i. The process 1200 continues to step 1212 to add the new height as the element $h_i$ and also fills in the elements between the current last element of the $h\text{Profile}(t_k)$ and the element $h_i$. In one embodiment, the process 1200 fills in these elements equally with the new relative height $H_f$. In another embodiment, the process 1200 fills in these elements by linear interpolating the new relative height and the existing last element of the relative height profile. Denoting $N=\text{length}(h\text{Profile}(t_k))$, and the current last element is $h_{(N-1)}$, for each element between $h_{(N-1)}$ and $h_i$, its value based on linear interpolation may be derived as follows: $h_j = h_{(N-1)} + h_j*(j-(N-1))/(i-(N-1))$, where $N \leq j \leq i$.

After updating the relative height profile with a new relative height value $H_f$, in one of the steps 1206, 1210, or 1212, the process 1200 exits and the process continues from step 1110 to 1112. In further embodiments where the distance sensor (e.g., sensor 72) includes more than one sensor component (e.g., multiple LIDAR sensors), there is more than one set of relative height and its associated horizontal distance pair (e.g., $H_f$, $L_f$) to process. The process 1200 may check if there are more relative heights and distance pairs ($H_f$, $L_f$) to process before it ends. If there are more relative heights and distance pairs to process, the process 1200 goes back to step 1202 to update the relative height profile with the next relative heights and distance pair ($H_f$, $L_f$) until there are no more relative heights and distance pairs ($H_f$, $L_f$) to process.

Returning to FIG. 11, in step 1112 a relative height to be utilized to control flight altitude is determined. For example, the relative height to be utilized is determined based on the relative height profile $h\text{Profile}(t_k)$ updated in 1110. In one embodiment, the processing unit 76 may choose the smallest relative height in the relative height profile as the relative height to be utilized to control flight altitude: $h_{final}(t_k) = \min(h\text{Profile}(t_k))$. In some embodiments, the processing unit 76 may determine a look-forward distance $L_x$ and choose the smallest relative height within the look-forward distance $L_x$. The look-forward distance $L_x$ may be determined based on the forward velocity $v_x$ from the motion sensor 74, e.g., $L_x = T_x*v_x$ or $L_x = \max(L_{min}, T_x*v_x)$, where $T_x$ is a pre-determined look-forward time and $L_{min}$ is a pre-determined minimum look-forward distance. The pre-determined look-forward time $T_x$ may be determined with consideration of the flight characteristics of the UAV. A shorter $T_x$ may be selected if the UAV is agile and a longer $T_x$ may be selected if the UAV responds slowly.

To determine the smallest relative height within the look-forward distance, the smallest element index whose corresponding position is ahead of $L_x$ is determined as $I_x = \text{ceil}(L_x/DX)$, where function ceil(a) is the smallest integer that is greater than a. For example, if $L_x = 3.2*DX$, then $I_x = \text{ceil}(3.2) = 4$. The smallest relative height within the look-forward distance is then determined as the smallest height among the first $I_x$ elements of the relative height profile.

In a further embodiment, the distance sensor (e.g., sensor 72) may include at least two separate sensor modules (e.g., two different LIDAR sensors) installed at two different pre-determined forward-downward angles $\beta_1$ and $\beta_2$. Each sensor module may provide a measurement of the distance from the UAV to a position on the terrain feature in front of the UAV. The processing unit 76 may receive both distance measurements $D_{f1}$ and $D_{f2}$ at step 1102, and calculate the corresponding $H_{f1}=D_{f1}*\sin(|\theta+\beta_1|)$, $H_{f2}=D_{f2}*\sin(|\theta+\beta_2|)$ as well as $L_{f1}=D_{f1}*\cos(|\theta+\beta_1|)$, $L_{f2}=D_{f2}*\cos(|\theta+\beta_2|)$ at step 1104. At step 1110, the processing unit 76 may update the relative height profile with the relative height information from both sensor modules. In one embodiment, each $H_{fi}$ is treated independently and the relative height profile is updated with each of them sequentially using the process 1200 of FIG. 12. The sequence of the update may be related to the pre-determined forward-downward angles $\beta_i$. For example, the relative height profile is first updated with the $H_{fi}$ from the sensor installed with the largest $|\beta_i|$ and continues to the $H_{fi}$ from the sensor with a smaller $|\beta_i|$. Since a sensor module configured with a larger $|\beta_i|$ looks closer than a sensor module with a smaller $|\beta_i|$ (that is, $L_{fi}<L_{fj}$ if $|\beta_i|>|\beta_j|$), the relative height profile is therefore first updated with $H_{fi}$ from sensor modules that look closer in distance and then updated with $H_{fi}$ from sensor modules that look further away. In another embodiment, linear interpolation is applied to generate a corresponding relative height for relative height profile elements in between two adjacent forward distances $L_{f1}$ and $L_{f2}$; these elements are also updated with the generated corresponding relative height.

In some embodiments, the distance sensor 72 may include at least one LIDAR (or radar) sensor installed at a pre-determined forward-downward angle $\beta$ and an ultrasonic (or radar) sensor facing directly downward. In step 1102, the processing unit 76 may receive both the forward-downward distance $D_f$ from the LIDAR (or radar) sensor module and the downward distance $D_d$ from the ultrasonic (or radar) sensor module. In step 1104, it calculates $H_f=D_f*\sin(|\theta+\beta|)$, $L_f=D_f*\cos(|\theta+\beta|)$, and $H_d=D_d$. Because the ultrasonic sensor module is looking down directly, it may be assumed that $L_d=0$. In step 1110, the processing unit 76 may update the relative height profile with $H_f$ and $H_d$ as previously described in conjunction with FIG. 11. Note that because $L_d=0$, $H_d$ is used to update the first element of the relative height profile.

In another embodiment, the distance sensor 72 may include a scanning LIDAR (or radar) sensor that sweeps through a range of forward-downward angles and provides an array of distance measurements $[D_{f1}, D_{f2}, \ldots, D_{fn}]$ at forward-downward angles $[\beta_1, \beta_2, \ldots, \beta_n]$ ($|\beta_1|>|\beta_2|>\ldots>|\beta_n|$). Accordingly, the processing unit 76 receives this array of measurements (and the array of forward-downward angles if the angles are not fixed or pre-determined) in step 902; it then computes arrays of $H_f$ and $L_f$ as follows:

$H_f=[H_{f1},H_{f2},\ldots,H_{fn}]$, where $H_{fi}=D_{fi}*\sin(|\theta+\beta_i|)$, and $L_f=[L_{f1},L_{f2},\ldots,L_{fn}]$, where $L_{fi}=D_{fi}*\cos(|\theta+\beta_i|)$.

Note that since $(|\beta_1|>|\beta_2|>\ldots>|\beta_n|)$, $L_{f1}<L_{f2}<\ldots<L_{fn}$.

In some embodiments, after the processing unit 76 determines the travel distance and altitude change in step 1106 and updates the relative height profile based on the travel distance and altitude change in step 1108, the relative height profile is updated based on the arrays of $H_f$ and $L_f$. The relative height profile may be updated using each $H_{fi}$ one by one as previously described. In some embodiments, linear interpolation is performed to generate relative height values for elements in the relative height profile that do not have a corresponding $H_{fi}$. For example, if $L_{f2}$ corresponds to the fourth element of the relative height profile and $L_{f3}$ corresponds to the sixth element, there is no $H_{fi}$ to update the fifth element. The processing unit 76 may compute a height value using linear interpolation of $H_{f2}$ and $H_{f3}$ to update the fifth element as well. Thus, by using linear interpolation, all height elements between forward distance $L_{f1}$ and $L_{fn}$ can be updated.

In some embodiments, the relative height profile (e.g., hProfile($t_k$)) may have an associated confidence array (e.g., hConf($t_k$)), where each element in the confidence array indicates the confidence level of its corresponding element in the relative height profile. That is, for hProfile($t_k$)=[$h_0(t_k)$, $h_1(t_k)$, $h_2(t_k)$, ...], the confidence array is hConf($t_k$)=[$c_0(t_k)$, $c_1(t_k)$, $c_2(t_k)$, ...], where $c_0(t_k)$ is the confidence level for $h_0(t_k)$, $c_1(t_k)$ is the confidence level for $h_1(t_k)$, and so on. In some embodiments, each element in the confidence array may be a value between 0 and 1, where 0 indicates no confidence while 1 indicates the highest confidence.

The confidence array may be updated along with the relative height profile in steps 1108 and 1110, and then in step 1112, the relative height is determined based on both the relative height profile hProfile($t_k$) and the confidence array hConf($t_k$). In one embodiment, in step 1108, as the relative height profile is updated based on the travel distance and altitude change, the confidence levels may be reduced to account for increased uncertainties as time lapses and/or UAV moves. Subsequently in step 1110, as the relative height profile hProfile($t_k$) is updated based on each $H_f$ and $L_f$, the confidence array hConf($t_k$) is updated along with $C_f$, the confidence level of each $H_f$. The confidence level $C_f$ may be a pre-defined value or it may be determined based on the characteristics (such as consistency and/or signal-to-noise ratio) of the measurements from the distance sensor.

In some embodiments in step 1112, the determination of the relative height may be based on both the relative height profile and the confidence array. In one embodiment, the processing unit 76 may choose the smallest height among height elements that have confidence levels above a pre-defined threshold. For example, if in the confidence array hConf($t_k$) only the confidence levels $c_{j1}(t_k)$, $c_{j2}(t_k)$, $c_{j3}(t_k)$, $c_{j4}(t_k)$ are greater than the pre-defined threshold, then $h_{final}(t_k)=\min(h_{j1}(t_k), h_{j2}(t_k), h_{j3}(t_k), h_{j4}(t_k))$. If there is no confidence level greater than the pre-defined threshold, the relative height element that has the minimum value may be selected as the relative height to be utilized for flight altitude control and its associated confidence level is also outputted. In embodiments where a look-forward distance $L_x$ is determined, the relative height to be utilized for flight altitude control is determined to be the smallest height among height elements within the look-forward distance $L_x$ and whose confidence levels are above a pre-defined threshold.

In step 1114, the determined relative height is utilized to control flight altitude. For example, a flight control command to adjust a flight height/altitude of the aerial vehicle is sent based on the determined relative height to maintain a consistent flight height (e.g., within a range) over the terrain/ground features when the aerial vehicle is flying over the terrain/ground. In some embodiments, controlling the flight altitude includes determining an amount of altitude increase or decrease required to maintain a consistent flight height over ground/terrain features. For example, a difference between a current relative height (e.g., distance between current vertical position of UAV and a terrain feature directly below the UAV) and the determined relative height (e.g., determined in 1112) to be utilized to control a flight altitude is calculated and utilized as the amount of altitude increase or decrease indicated in the flight control command (e.g., increase/decrease from current vertical altitude) to lower (e.g., current relative height is less than the determined relative height) or raise (e.g., current relative height is greater than the determined relative height) the flight height/altitude of an aerial vehicle. In some embodiments, the distance between the UAV and a terrain feature beneath the UAV must be at least a configured minimum distance and/or within a configured range and the controlling the flight altitude includes providing an instruction to increase or decrease a flight height/altitude of the aerial vehicle such that at least the minimum distance and/or the range will be maintained when controlling the flight altitude.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
measuring a distance from an aerial vehicle to a terrain feature located forward and lower with respect to the aerial vehicle;
detecting an orientation of the aerial vehicle, wherein the orientation includes an orientation angle of the aerial vehicle;
using at least the measured distance, a positioning angle of the measured distance, and the orientation angle of the aerial vehicle to determine a relative vertical difference between a vertical location of the aerial vehicle and a vertical location of the terrain feature, including by using the positioning angle of the measured distance together with the orientation angle of the aerial vehicle to determine a calculated angle of the measured distance; and
using the determined relative vertical difference to automatically adjust a flight altitude of the aerial vehicle.

2. The method of claim 1, wherein determining the relative vertical difference includes is calculating the relative vertical difference using a geometric relationship between the measured distance and the relative vertical difference based on an angular relationship defined at least in part by the detected orientation of the aerial vehicle.

3. The method of claim 1, further comprising calculating a horizontal distance from the aerial vehicle to the terrain feature using at least the measured distance and the detected orientation, including by determining a horizontal distance component of the measured distance based on the calculated angle.

4. The method of claim 1, wherein the flight altitude of the aerial vehicle is automatically adjusted during aerial application of a spray product.

5. The method of claim 1, wherein the automatic adjustment of the flight altitude of the aerial vehicle is one of a plurality of automatic flight altitude adjustments made to vertically follow heights of terrain features in a flight path of the aerial vehicle.

6. The method of claim 1, wherein the distance is measured using a distance sensor coupled on the aerial vehicle at the forward-downward angle with respect to the aerial vehicle.

7. The method of claim 1, wherein the distance is measured using a distance sensor that includes at least one of the following: a LIDAR sensor, a radar sensor, or an ultrasonic sensor.

8. The method of claim 1, wherein the distance is measured using a distance sensor that includes a plurality of different sensors configured at different measurement angles.

9. The method of claim 1, wherein the aerial vehicle is coupled to an ultrasonic sensor configured to measure a distance to another terrain feature located directly under the aerial vehicle.

10. The method of claim 1, further comprising using a velocity of the aerial vehicle to determine a look-forward distance associated with the determined relative vertical difference.

11. The method of claim 10, wherein the look-forward distance is calculated at least in part by multiplying the velocity with a specified time value.

12. The method of claim 1, wherein the orientation of the aerial vehicle is detected using a sensor that includes one or more of the following: an inertial measurement unit or a global positioning system receiver.

13. The method of claim 1, further comprising updating a relative height profile, wherein the relative height profile includes relative height values of terrain features located at various distances away from the aerial vehicle.

14. The method of claim 13, wherein updating the relative height profile includes determining an element index of the relative height profile corresponding to the determined relative vertical difference and comparing the determined element index with a length of the relative height profile.

15. The method of claim 13, wherein updating the relative height profile includes:
identifying an element of the relative height profile corresponding to the determined relative vertical difference and updating the element, or
adding the determined relative vertical difference to the relative height profile.

16. The method of claim 13, further comprising modifying the relative height profile based on an altitude change of the aerial vehicle including by adding a value indicating the altitude change to one or more entries of the relative height profile.

17. The method of claim 13, further comprising modifying the relative height profile based on a horizontal travel distance of the aerial vehicle including by shifting one or more entries of the relative height profile based on a magnitude of the horizontal travel distance.

18. The method of claim 13, wherein the one or more relative height values included in the relative height profile are each associated with an indicator of confidence of the associated relative height value.

19. The method of claim 1, wherein using the determined relative vertical difference to automatically adjust the flight altitude of the aerial vehicle includes selecting the determined vertical difference as a smallest value among a group of vertical differences associated with a look-forward distance of the aerial vehicle.

20. A system, comprising:
a first sensor configured to measure a distance from an aerial vehicle to a terrain feature located forward and lower with respect to the aerial vehicle;
a second sensor configured to detect an orientation of the aerial vehicle, wherein the orientation includes an orientation angle of the aerial vehicle; and
a processor configured to:
use at least the measured distance, a positioning angle of the measured distance, and the orientation angle of the aerial vehicle to determine a relative vertical difference between a vertical location of the aerial vehicle and a vertical location of the terrain feature, including by using the positioning angle of the measured distance together with the orientation angle of the aerial vehicle to determine a calculated angle of the measured distance; and use the determined relative vertical difference to automatically cause an adjustment of a flight altitude of the aerial vehicle.

* * * * *

UNITED STATES PATENT AND TRADEMARK OFFICE
CERTIFICATE OF CORRECTION

PATENT NO. : 11,169,541 B2  
APPLICATION NO. : 16/426392  
DATED : November 9, 2021  
INVENTOR(S) : Han-Shue Tan and Jihua Huang Page 1 of 1

It is certified that error appears in the above-identified patent and that said Letters Patent is hereby corrected as shown below:

On the Title Page

Item (73), assignee, address, after "Suzhou Eavision Robotic Technologies Co., Ltd.", insert --, Jiangsu Province (CN)--.

In the Claims

In Column 17, Line(s) 37, Claim 2, after "includes", delete "is".

Signed and Sealed this
Eleventh Day of October, 2022

Katherine Kelly Vidal
*Director of the United States Patent and Trademark Office*